UNITED STATES PATENT OFFICE.

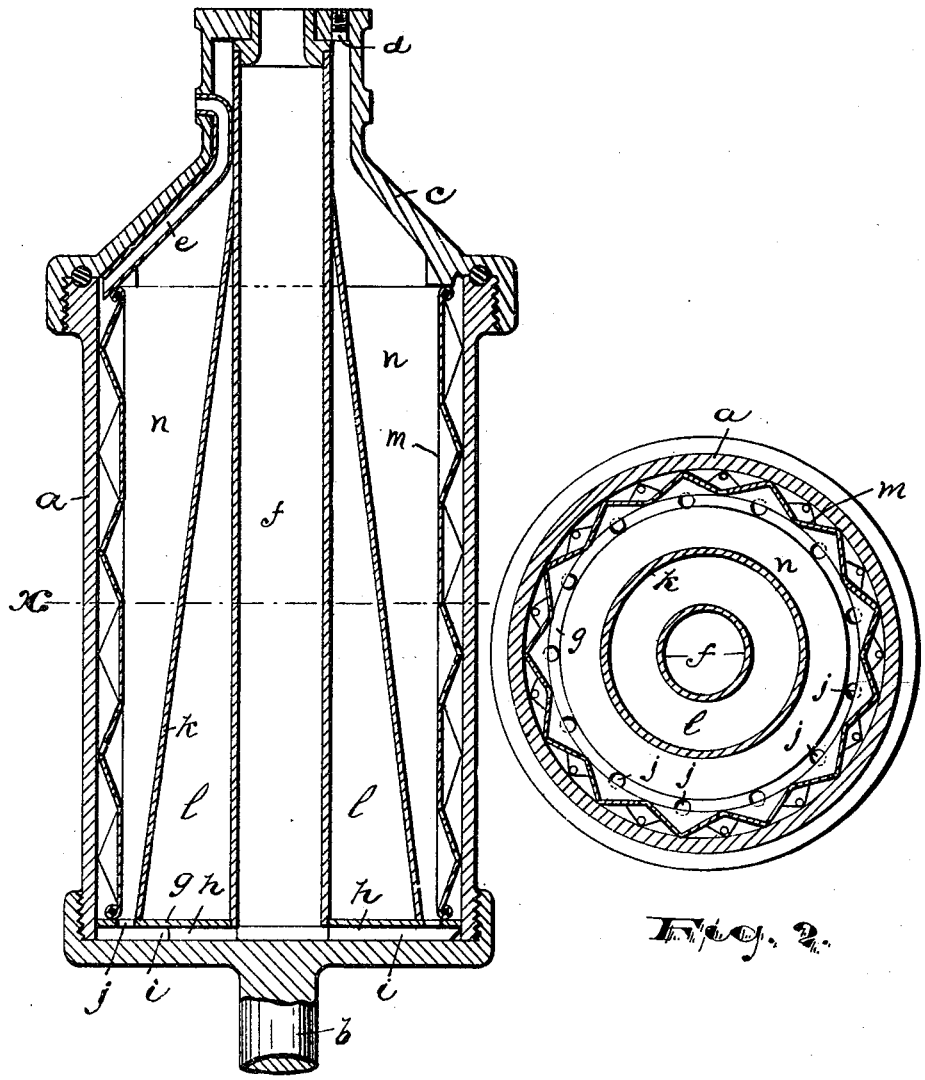

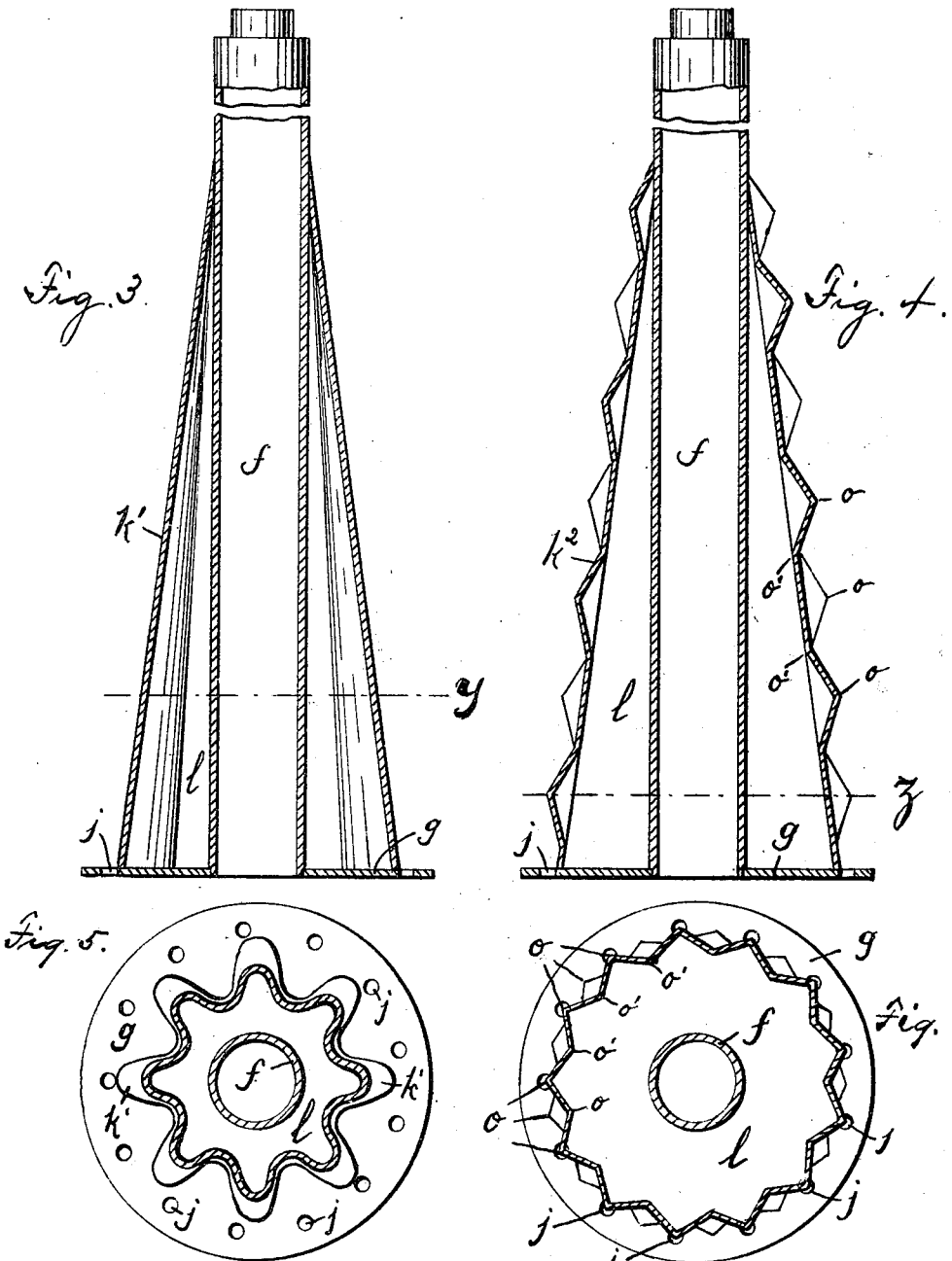

JAMES H. FLEMING, OF NEWARK, NEW JERSEY, ASSIGNOR TO THE NATIONAL DAIRY MACHINE COMPANY, OF NEW JERSEY.

CENTRIFUGAL CREAM-SEPARATOR.

SPECIFICATION forming part of Letters Patent No. 666,344, dated January 22, 1901.

Application filed January 16, 1900. Serial No. 1,601. (No model.)

*To all whom it may concern:*

Be it known that I, JAMES H. FLEMING, a citizen of the United States, residing at Newark, in the county of Essex and State of New Jersey, have invented certain new and useful Improvements in Cream-Separating Devices for Centrifugal Creamers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to reduce the body of fluid stored in the separating-bowl during the separating operations, and thus to economize power in effecting the desired separation without at the same time reducing the separating capacity of the bowl or impairing its efficiency, and to secure other advantages and results, some of which may be referred to hereinafter in connection with the description of the working parts.

The invention consists in the improved centrifugal separating-bowl and in the arrangements and combinations of parts of the same, all substantially as will be hereinafter set forth and finally embraced in the clauses of the claim.

Referring to the accompanying drawings, in which like letters of reference indicate corresponding parts in each of the several views, Figure 1 is a vertical section of the bowl, taken through the axis thereof; and Fig. 2 is a horizontal section taken at line $x$, Fig. 1. Fig. 3 is a vertical section of the feed-tube, conical partition, and bottom disk, taken through the axial center of the feed-tube and showing a modification of the conical partition; and Fig. 4 is a similar view showing a still further modified form of partition. Figs. 5 and 6 are horizontal cross-sections taken on line $y$, Fig. 3, and line $z$, Fig. 4, respectively.

In said drawings, $a$ indicates a cylindrical bowl, of any suitable construction, supported upon a rotary shaft $b$, to which highly-rapid motion is imparted by any of the means common in centrifugal separators.

The cover $c$ is provided with a central opening or passage, through which the whole or new milk is supplied, and with exit ducts or passages $d\ e$ for the cream and blue or skim milk. These also may be arranged in any manner convenient.

In connection with the central opening or inpassage I provide a feed-tube $f$, which lies vertically at the axis of the bowl and extends downward from the central opening of the cover to a point at or near the bottom, where it is provided with a horizontal disk or plate $g$. Said disk or plate is perforated at its center to receive said tube and is of a diameter equaling or nearly equaling the horizontal diameter of the interior of the bowl, so as to fit therein closely. On the under side of the said disk the same is provided with supports $h$, adapted to hold said disk a little up from the bottom to form a flow-passage $i$ from the bottom end of the feed-tube $f$ outward. At or near its periphery the said disk is perforated or notched at a number of points, as at $j$, to permit an upflow of fluid at the point where the centrifugal force is great. Extending upward from said plate or disk $g$ in from said opening $j$ is a conical plate $k$, the lower edge of which is fastened to the plate or disk $g$ and the edge at the upper end being fastened around the feed or supply tube $f$ near its top. The joints where the hollow cone $k$ connects with the disk or plate $g$ and tube $f$ are made impervious by solder, tinning, or otherwise, so that no liquid can enter the chamber $l$, and thus the bowl remains empty at the point where the separation is least effective, so that the weight of fluid to be supported by the bowl, its shaft, and shaft-bearings is materially reduced, especially so in the large machines, all of which conduces to economy of wear and power. The hollow cone, which extends from the said disk at the bottom up to the top of said bowl, forms, with said bowl, which is cylindrical, or with the cylindrical partition $m$ therein, an annular chamber, which continues to increase regularly in horizontal width and capacity from the bottom to the top, the said chamber being vertically open or devoid of partitions, so that the cream when once separated from the blue milk may flow directly upward to its exit, while the said blue milk is brought into contact with the partition having protuberances, as hereinafter described.

Outside of and around the hollow cone is arranged a cylindrical partition m, with protuberances such as are shown in the patent of Oscar Anderson, No. 576,994, issued February 16, 1897. This partition preferably lies against the inner wall of the bowl a and forms, with the cone k, an upwardly-flaring annular chamber n, with which the passages j through the disk g coincide. The new milk upon being fed to the tube f flows downward and outward through the flow-passage i and thence upward into the small end of the chamber n, subjected to high centrifugal force, which tends to separate the light fatty globules or particles of cream from the blue milk. The partition k, lying toward or inside of the layer or wall formed by the cream near the center of the bowl, serves to hold said cream nearer the outside of the bowl, where it will be subjected to greater centrifugal force and a more thorough and complete separation of the skim-milk obtained. The cream flows or passes upward along the partition k, which serves as a guide, and ultimately escapes at the top of the bowl through the aperture d in the usual manner.

Under some conditions I may prefer to employ a modified form of conical partition k', as shown in Figs. 3 and 5, where the surface of the partition is shown undulating or curved in and out in a circumferential direction. The effect of this construction is to provide greater surface for the cream in order that it may be spread in a thinner layer and better opportunity presented for separation to take place.

In Figs. 4 and 6 I have shown a conical partition k², corrugated or provided with protuberances o o', which extend alternately in and out, as in the cylindrical partition m of the Anderson patent before referred to. The area of the cream wall or layer is thus increased and its upward movement delayed, so that a more thorough separation of the skim-milk is facilitated.

Having thus described the invention, what I claim as new is—

1. In a centrifugal separator, the combination with the rotary bowl and a central vertical supply-tube extending from the top of said bowl to near the bottom thereof, of a cone having said tube extended through its apex at the top of the bowl and through its base at the bottom of said bowl, an open passage in communication with said tube being formed at said bottom leading into the separating-chamber between the outside walls of the cone and the inside walls of the bowl, the said cone forming a dead-space within the bowl which increases in horizontal dimensions toward the base of the cone, substantially as set forth.

2. In a centrifugal separator, the combination with the rotary bowl and a central supply-tube extending downward from the top of the bowl to near the bottom thereof, of a conical partition k, arranged outside of said tube and connecting with the same at the small end of said partition and a disk g, connecting the lower end of the tube with the large end of the conical partition, the tube, conical partition and disk forming a dead hollow space about the tube which gradually increases in horizontal area from near the top to near the bottom of the bowl, substantially as set forth.

3. In a centrifugal separator, the combination with the rotary bowl, and a central supply-tube extending downward from the top of the bowl to near the bottom thereof, of a conical partition k, arranged outside of said tube and connecting with the same at the small end of said partition and a disk g, connecting the lower end of the tube with the large end of the conical partition, the tube, conical partition and disk forming a dead hollow space about the tube which gradually increases in horizontal area from near the top to near the bottom of the bowl, and a cylindrical partition m, arranged outside of the conical partition and having its surface broken by protuberances, substantially as set forth.

4. In a centrifugal separator, the combination with the rotary bowl, and a central supply-tube extending downward from the top of the bowl to near the bottom thereof, of a conical partition k, arranged outside of said tube and connecting with the same at the small end of said partition and a disk g, connecting the lower end of the tube with the large end of the conical partition, the tube, conical partition and disk forming a dead hollow space about the tube which gradually increases in horizontal area from near the top to near the bottom of the bowl, and a cylindrical partition, m, arranged near the inside wall of the bowl, the partitions m and k, forming a graduated space between, which increases in horizontal area from near the bottom to near the top of the bowl and which space provides an open upflow-passage for the cream, substantially as set forth.

In testimony that I claim the foregoing I have hereunto set my hand this 9th day of September, 1899.

JAMES H. FLEMING.

Witnesses:
CHARLES H. PELL,
C. B. PITNEY.